United States Patent Office 3,319,840
Patented May 16, 1967

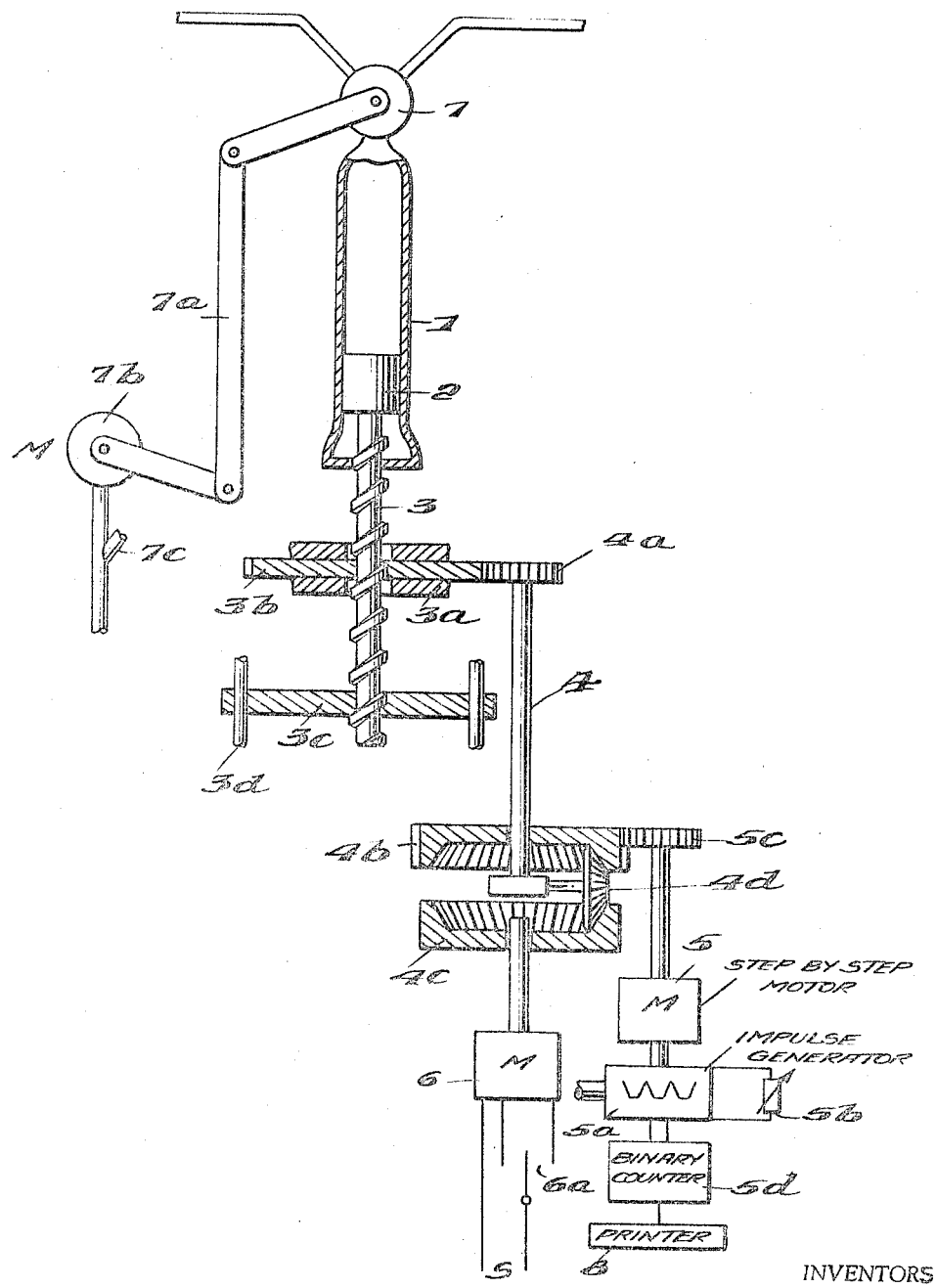

3,319,840
BURETTE, ESPECIALLY FOR DISPENSING
SMALL VOLUMES
Friedrich Oehme and Hans-Joachim Wolf, Bassersdorf, Switzerland, assignors to Polymetron AG, Zurich, Switzerland, a corporation of Switzerland
Filed Mar. 15, 1965, Ser. No. 439,583
Claims priority, application Switzerland, Mar. 16, 1964, 3,500/64
2 Claims. (Cl. 222—333)

The invention relates to a burette, and especially to a device which discharges measured doses from a cylinder by the axial movement of a piston.

Burettes are known which permit fairly exact dosing of fluids through movement of a piston in a precisely calibrated cylinder. In these, the movement of the piston is produced either by hand or by an electric motor. Frequently the drive mechanism is a threaded spindle turning in a unit. The reading off of the volume of material expelled from the cylinder by the piston can be accomplished either by a measuring clock connected to the piston rod or by a drum carried by the nut with additional measurement of the piston displacement. It is also known to determine the volume by a mechanical multiplex revolution counter.

All these ways of determining volume work well if relatively large volumes are being discharged from the cylinder by the piston. They are, however, not very practical in connection, for example, with automatic potentiometric or conductometric titrations in the neighborhood of the chemical equivalence point where, to avoid overtitration, only a very small volume should be used. This is because, in the turning or driving of the shaft of ordinary motors by feeding short pulses, electrical or mechanical lag occurs, with the result that the motor does not turn through an angle corresponding to the duration of the current pulse. This error is the greater, the shorter the current pulse, and in the case of extremely short pulses it is possible that no movement takes place.

The primary object of the present invention is to provide a burette which makes possible the very exact feeding of small quantities of a fluid and an accurate determination of the amount fed.

The purpose of the invention is to increase the dosage accuracy of motor driven piston burettes, especially for dosages of small volume, and simultaneously, for example by the use of digital electromechanical or electrical counters, to make the reading off of the volume fed more reliable and easier. In particular the invention contemplates the use of a step-by-step motor fed by an impulse generator.

A step-by-step motor responds, because of its special construction, to very short impulses and is capable, even at very high impulse frequencies such as 1000 per second, of receiving a single impulse without failure and of turning through the proper angles. Thus volumes as low as 1 microliter can be measured and read off. It is advantageous to have the individual impulses not only drive the motor but also be counted by an electromechanical or electrical counter and indicated digitally.

For filling or emptying the cylinder of the burette, in order to move the piston rapidly, a second ordinary motor is provided. The step-by-step motor does not operate during filling or emptying. The interchangeable use of the step-by-step and ordinary motors is made possible by a special differential drive. Likewise the change in the outlet of the burette required for conversion between dosing and filling can be accomplished by the operation of an outlet valve carried by the cylinder through a specially provided motor, which is controlled for example by relays operated by the computer or by limit switches on the piston rod.

Further objects and advantages of the invention will appear more fully from the following description, especially when taken in conjunction with the accompanying drawing which forms a part thereof.

The drawing shows, in part schematically, a burette embodying the invention.

Piston 2, which is axially slidable in cylinder 1, has its piston rod 3 externally threaded, passing freely through the bottom of the cylinder. The movement of piston 2, for filling, dosing or emptying, is produced by turning of a pinion 3b having a central opening threadedly receiving the piston rod, and held against axial movement by the frame 3a, so that turning of pinion 3b produces axial movement of the piston rod 3. Turning of piston rod 3 is prevented by fixing its lower end in a cross-piece 3c slidably guided on parallel rods 3d.

Pinion 3b is driven by a pinion 4a carried by a shaft 4 which, at its lower end, carries the planet gear 4d of a differential, planet gear 4d meshing with gears 4b and 4c. Gear 4b engages a gear 5c driven by a step-by-step motor 5, which is fed with impulses by an impulse generator 5a with a frequency regulator 5b. Gear 4c is driven for filling and emptying the cylinder by a normal continuous motor, 6, reversible through switch 6a. When the motor is disconnected it has, through current excitation, a high stopping moment.

The conversion of the fluid path to the cylinder for the purpose of filling or emptying or of dosing is accomplished by a valve 7 connected to the cylinder which is operated by a motor 7b through connection 7a. The motor is controlled by a switch 7c operated by limit switches carried by the piston rod 3.

For determining the volume fed out of the cylinder 1 by the piston 2, an electronic or electromechanical counter 5d is provided which is controlled by the impulse generator 5a in synchronism with the motor 5. This can also be constructed for simultaneously printing the results by a printer 8.

For registering the volumes fed a recorder can be used, the paper feed of which is produced by a second step-by-step motor which is likewise controlled by the impulse generator 5.

The parts shown, especially the cylinder 1 with its piston 2 and the step-by-step motor 5 for the piston with its impulse generator 5a are preferably built into a single instrument. A second step-by-step motor for driving a counter, an indicator or a printing device for showing the volume discharged from the cylinder can be located at any desired distance from the instrument unit.

While we have described herein one embodiment of our invention, we wish it to be understood that we do not intend to limit ourselves thereby except within the scope of the claims hereto or hereinafter appended.

We claim:
1. A burette comprising a cylinder, a piston movable in said cylinder, a step-by-step electric motor, a continuous electric motor, differential mechanism operatively connecting both said motors to the piston for moving the same, and an impulse generator connected to the step-by-step motor for feeding operating impulses thereto.

2. A burette comprising a cylinder, a piston movable in said cylinder, a step-by-step electric motor, a continuous electric motor, a nonturnable threaded spindle connected to the piston, an internally threaded nut held against axial movement threadedly engaging the spindle, differential mechanism operatively connecting both said motors to the nut, and an impulse generator connected to the step-by-step motor for feeding operating impulses thereto.

References Cited by the Examiner

UNITED STATES PATENTS

| | | | |
|---|---|---|---|
| 2,612,428 | 9/1952 | Vroom. | |
| 2,679,308 | 5/1954 | Moore et al. | 194—13 |
| 2,925,198 | 2/1960 | Healey | 222—32 |
| 2,966,175 | 12/1960 | Hyde | 222—37 X |
| 3,173,575 | 3/1965 | Gugerli et al. | 222—333 X |
| 3,241,017 | 3/1966 | Madsen et al. | 318—138 |

ROBERT B. REEVES, *Primary Examiner.*

KENNETH N. LEIMER, *Examiner.*